(12) United States Patent
Tokic et al.

(10) Patent No.: US 12,704,831 B2
(45) Date of Patent: Aug. 11, 2026

(54) METHOD FOR COMPUTER-IMPLEMENTED CONFIGURATION OF A CONTROLLED DRIVE APPLICATION OF A LOGISTICS SYSTEM

(71) Applicant: Siemens Aktiengesellschaft, Munich (DE)

(72) Inventors: Michel Tokic, Tettnang (DE); David Grossenbacher, Prague (CZ); Daniel Hein, Munich (DE); Michael Leipold, Nuremberg (DE); Volkmar Sterzing, Neubiberg (DE); Steffen Udluft, Eichenau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1104 days.

(21) Appl. No.: 17/776,355

(22) PCT Filed: Nov. 2, 2020

(86) PCT No.: PCT/EP2020/080635
§ 371 (c)(1),
(2) Date: May 12, 2022

(87) PCT Pub. No.: WO2021/099096
PCT Pub. Date: May 27, 2021

(65) Prior Publication Data
US 2022/0397887 A1 Dec. 15, 2022

(30) Foreign Application Priority Data
Nov. 20, 2019 (EP) .................................... 19210263

(51) Int. Cl.
*G05B 19/418* (2006.01)

(52) U.S. Cl.
CPC ..... *G05B 19/4182* (2013.01); *G05B 19/4189* (2013.01)

(58) Field of Classification Search
CPC ............ G05B 19/4182; G05B 19/4189; G05B 2219/32357; G05B 13/027;
(Continued)

(56) References Cited

U.S. PATENT DOCUMENTS 11,498,764 B2 * 11/2022 Gorman ............. G06Q 10/0639
2002/0112938 A1 * 8/2002 Shiohara .............. B65G 47/681 198/363
(Continued)

FOREIGN PATENT DOCUMENTS

CN 1369419 A 9/2002
CN 101198975 A 6/2008
(Continued)

OTHER PUBLICATIONS

Gary Gang Jing et al. “Modeling a controlled conveyor network with merging configuration” (Year: 1998).*
(Continued)

*Primary Examiner* — Jacob S. Scott
*Assistant Examiner* — Erin Morris
(74) *Attorney, Agent, or Firm* — Schmeiser Olsen PLLC

(57) ABSTRACT

A method for configuration of a controlled drive application of a logistics system. The logistics system includes parallel conveying paths for piece goods. Each conveying path includes sub-conveying paths which are each accelerated or delayed to merge the piece goods on a single output conveying path with defined spacing. A system model of the logistics system is firstly determined by operating data of the logistics system which include sensor values of the logistics system and changes to control variables. A control function is determined, which includes configuration data for the
(Continued)

Figure 1:
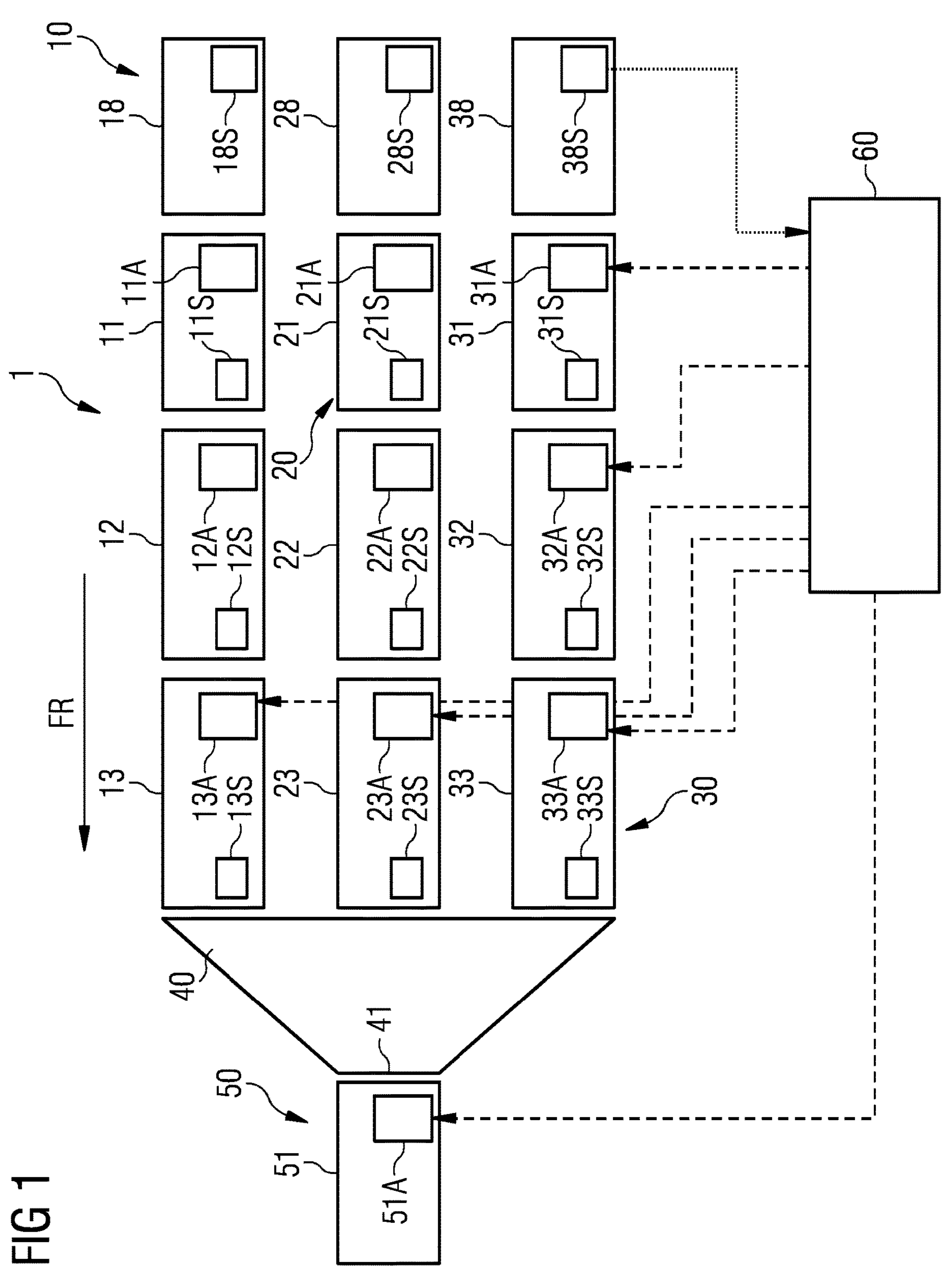

drives, with at least one control action being performed on the precondition of one or more performance features that are to be achieved in the system model, during which control action the operating data is simulated for a plurality of time steps.

12 Claims, 2 Drawing Sheets

(58) Field of Classification Search
CPC .... G05B 19/41885; G05B 2219/33056; G05B 19/0426; G05B 2219/2621
See application file for complete search history.

(56) References Cited

U.S. PATENT DOCUMENTS

2003/0015396 A1 1/2003 Mennie
2010/0036522 A1 2/2010 Stich
2014/0050087 A1 2/2014 Pasotti et al.
2014/0202829 A1 7/2014 Eberhardt et al.
2018/0057271 A1* 3/2018 Vitalini .................. B65G 47/31
2018/0127217 A1 5/2018 Henze
2018/0356793 A1* 12/2018 Kanemaru ......... G05B 19/4083
2019/0056718 A1* 2/2019 Satou ................. G05B 19/4182

FOREIGN PATENT DOCUMENTS

CN 103518137 A 1/2014
CN 107750229 A 3/2018
CN 107777275 A 3/2018
CN 108792586 A * 11/2018 ........... B65G 47/268
CN 109649910 A 4/2019
CN 117332834 A * 1/2024 ............. G06N 3/084
DE 102005027687 A1 * 12/2006 ............. G06Q 10/08
DE 102015106034 A1 * 10/2016 ............. B65G 43/00
DE 102018006551 A1 * 2/2019 ............... G06N 3/08
EP 1228986 A1 * 8/2002 ........... B65G 47/681
EP 3287396 B1 * 12/2023 ............. B65G 37/00
EP 4299478 A1 * 1/2024 ............. B65G 13/10
JP 4048029 B2 * 2/2008 ........... B65G 47/681

OTHER PUBLICATIONS

Michael Johnstone et al. “Simulation-based baggage handling system merge analysis” (Year: 2015).*
Daniel Szego “Combining conveyor belt with artificial intelligence” (Year: 2018).*
DE 102018006551 EN translation (Year: 2019).*
PCT/EP2020/080635 EN translation (Year: 2022).*
Jing et al. Modeling CNMC (Year: 1998).*
Johnstone Michael et al: “Simulation-based baggage handling system merge analysis”, Simulation Modelling Practice and Theory, vol. 53, pp. 45-59, XP055691968, Amsterdam, NL; ISSN: 1569-190X, DOI: 10.1016/j.simpat.2015.01.003; the whole document; 2015.
Szego Daniel: “Combining conveyor belt with artificial intelligence”, pp. 1-6, XP055691970, Gefunden im Internet: URL:http://danielszego.blogspot.com/2018/04/combining-conveyor-belt-with-artificial.html; [gefunden am May 6, 2020]; the whole document; 2018.
Gang Gary Jing et al: “Modeling a controlled conveyor network with merging configuration”, Simulation Conference Proceedings, 1998. Winter Washington, DC, USA Dec. 13-16, 1998, Piscataway, NJ, USA, IEEE, US, vol. 2, pp. 1041-1048, XP010319553, ISBN: 978-0-7803-5133-2; the whole document; 1998.
PCT International Search Report and Written Opinion of International Searching Authority mailed Sep. 2, 2021 corresponding to PCT International Application No. PCT/EP2020/080635 filed Nov. 2, 2020.

* cited by examiner 1
10
11
11A
11S
12
12A
12S
13
13A
13S
18
18S
20
21
21A
21S
22
22A
22S
23
23A
23S
28
28S
30
31
31A
31S
32
32A
32S
33
33A
33S
38
38S
40
41
50
51
51A
60
FR

METHOD FOR COMPUTER-IMPLEMENTED CONFIGURATION OF A CONTROLLED DRIVE APPLICATION OF A LOGISTICS SYSTEM

CROSS-REFERENCE TO RELATED APPLICATIONS

This application claims priority to PCT Application No. PCT/EP2020/080635, having a filing date of Nov. 2, 2020, which claims priority to EP Application No. 19210263.0 having a filing date of Nov. 20, 2019, the entire contents both of which are hereby incorporated by reference.

FIELD OF TECHNOLOGY

The following relates to a method and an apparatus for computer-implemented configuration of a controlled drive application of a logistics system.

BACKGROUND

A so-called "dynamic gapper" is a controlled drive application used in intralogistics. This application is intended to result in packages that are generally conveyed by two or more parallel conveyor sections in one direction being merged onto a single output conveyor section. The intention is for the packages, which are situated at undefined intervals on the two or more parallel conveyor sections, to be sorted onto the output conveyor section by means of a combining unit and at the same time placed at defined intervals.

The combining of the packages and the production of defined intervals are achieved by means of multiple conveyor sub-belts of respective conveyor sections. The respective conveyor sub-belts are driven by geared motors and controlled by a frequency converter. The setpoint values for the speeds of respective conveyor subsections are predefined by a controller. Positions of the packages on the conveyor subsections are detected by sensor and processed in the controller. The position between the packages is generally influenced by PI controllers that act between each pair of packets. The available information is taken by the controller as a basis for differently accelerating and decelerating the conveyor subsections.

Owing to the multiplicity of parallel conveyor sections and in each case multiple conveyor sub-belts that need to be accelerated and decelerated independently of one another, the control engineering of the controller is sophisticated. The optimization on the basis of different package sizes and qualities is complex. The adjustment of the control process for different mechanical design types is large. If e.g. the number of conveyor sections or the length of the individual conveyor subsections is altered, this has a significant influence on the control process and necessitates adjustments in the controller.

A fundamentally superordinate aim of the application is to be able to optimize the throughput of such a controlled drive application dynamically while the process is ongoing, a simultaneous intention being to avoid malfunctions of the controlled drive application, e.g. on account of collisions between individual packages.

SUMMARY

An aspect relates to a method and an apparatus for computer-implemented configuration of a controlled drive application of a logistics system that solves these problems easily and reliably.

Embodiments of the invention propose a method for computer-implemented configuration of a controlled drive application of a logistics system. The logistics system comprises one or more parallel-running conveyor sections for piece goods. Piece goods are in particular packages that are intended to be supplied to a sorting installation, for example. The present method is also suitable for all other types of piece good, however. The conveyor sections each lead to a combining unit in a conveying direction. Each of the conveyor sections consists of a plurality of conveyor subsections that are arranged in succession, with the result that a piece good may be transferred from one conveyor subsection to another, adjoining conveyor subsection without interruption. The conveyor subsections are accelerated or decelerated by a respective associated drive under the control of a computing unit. The acceleration or deceleration is effected individually for each conveyor subsection. The acceleration or deceleration may also comprise an acceleration or deceleration value of 0. The selective acceleration or deceleration of a respective conveyor subsection renders the combining unit arranged at the end of the conveyor sections able to combine the piece goods onto a single output conveyor section at defined intervals. In other words, the piece goods are placed onto the output conveyor section at defined intervals from one another.

The method of embodiments of the present invention involves the following steps being carried out:

A system model of the logistics system is determined on the basis of operating data of the logistics system, the operating data being available for a multiplicity of times in the operation of the logistics system and comprising, for each time, measured values from sensors of the logistics system and manipulated variable changes. The system model is a simulation model that reproduces the dynamics of the logistics system.

In a next step, a control function of the logistics system is determined, the control function comprising at least configuration data for the drives. The control function is determined on the basis of the system model by specifying one or more performance features to be attained in order to perform at least one control operation in the system model, involving simulating the operating data for a multiplicity of time steps. A reward quantity is ascertained for each time step, wherein the control operation is used as the control function, involving a predefined fitness function that aggregates the reward quantities for a multiplicity of time steps satisfying a predetermined criterion, and in particular being maximized.

The method of embodiments of the invention is a simple method for computer-implemented determination of configuration data for the drives associated with the conveyor subsections. Configuration data as defined by embodiments of the invention are in particular control signals for the drives in order to accelerate or decelerate the associated conveyor subsections in a suitable manner in order to render the combining unit able to combine the piece goods supplied via the multiple parallel conveyor sections onto a single output conveyor section at defined intervals.

In particular, the system model is determined using supervised learning methods. A particular preference in this case is the use of a neural network or a recurrent neural network. The control function is determined in particular by way of reinforcement learning.

The use of machine learning methods dispenses with the sophistication for the manual adjustment of the control function. The configuration data may be determined in automated fashion as a result. The use of reinforcement learning methods for determining the control function allows better and more reliable solutions to be found than was possible previously by way of manual adjustment. This allows a higher throughput to be attained at the output of the combining unit. Additionally, it is possible to convey successive piece goods on the output conveyor section with greater regularity.

The use of supervised learning methods for creating the system model, in combination with fast optimization of control, facilitates short-term adjustment of predefined optimization aims in the shape of performance features that are to be attained. As a result, lower costs of startup of the logistics system may be achieved. In addition, the performance of the logistics system may be improved.

An expedient configuration of the method provides for the sum of the performance feature(s) over the simulated time steps to be processed as the fitness function. The fitness function used may be e.g. the sum of a specific performance feature over time, e.g. a mean throughput of piece goods at the output of the combining unit.

One or more of the following parameters may be processed as a performance feature: a mean throughput of piece goods at the output of the combining unit; an, in particular minimum, interval between two piece goods conveyed in direct succession (the interval between two piece goods conveyed in direct succession is also referred to as the gap interval); the detection of a collision in the combining unit, in particular at the output thereof; an interval uniformity measure that characterizes a deviation of the intervals from an equidistance between each pair of piece goods conveyed in direct succession; a running speed of the conveyor subsections of a respective conveyor section or of all of the conveyor sections. As explained above, the control may be performed in the system model by specifying one or more performance features to be attained.

According to a further preferred configuration, there is provision for the control function to be determined by varying one or more input variables of the system model. One or more of the following parameters may be processed as input variables of the system model: a respective speed of the conveyor subsections (corresponding to a respective rotation speed of the drives); a position of a respective piece good on a respective conveyor section or a conveyor subsection of a respective conveyor section; a size, in particular length, of a respective piece good; a throughput of piece goods at the output of the combining unit; a collision in the combining unit, in particular at the output thereof. A collision may be detected for example by virtue of no further piece goods being detected downstream of the output of the combining unit after a predefined period of time has elapsed.

The input variables that are varied in order to determine the control function of the system model are simultaneously the operating parameters of the system model. Said parameters are therefore available for determining the system model as operating data for a multiplicity of times in the operation of the logistics system and comprise measured values from sensors of the logistics system and also manipulated variable changes, such as e.g. an alteration of a respective speed of the conveyor subsections.

Besides the method described above, embodiments of the invention relate to an apparatus for computer-implemented configuration of a controlled drive application of a logistics system, wherein the apparatus comprises a computing unit for controlling a respective drive associated with the conveyor subsections to accelerate or decelerate, the computing unit being designed to carry out the method according to one or more preferred embodiments of the invention.

Further, embodiments of the invention relate to a logistics system having one or more parallel-running conveyor sections for piece goods as described herein. According to embodiments of the invention, the logistics system in this case comprises an apparatus according to one or more preferred configurations of the type described herein.

Finally, embodiments of the invention relate to a computer program product (non-transitory computer readable storage medium having instructions, which when executed by a processor, perform actions) containing program code, which is stored on a nonvolatile, machine-readable carrier, for carrying out a method according to one or more preferred embodiments of the invention when the program code is executed on a computer.

BRIEF DESCRIPTION

Figure 2:
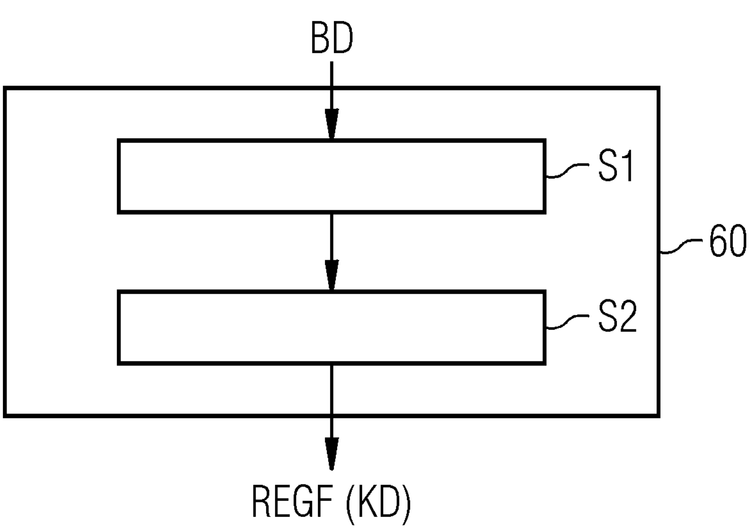

Some of the embodiments will be described in detail, with reference to the following figures, wherein like designations denote like members, wherein:

FIG. 1 shows a schematic representation of a logistics system having a computing unit for carrying out the method for computer-implemented configuration of the controlled drive application put into effect therein according to the invention; and FIG. 2 shows a schematic representation of the method steps carried out by the computing unit.

DETAILED DESCRIPTION

FIG. 1 shows a schematic representation of a logistics system 1 having a controlled drive application. By way of illustration, the logistics system 1 comprises three conveyor sections 10, 20, 30 running parallel to one another, each of which may be used to convey piece goods, in particular packages, in a conveying direction FR running from right to left. Each of the conveyor sections 10, 20, 30, which are of identical length and also referred to as fingers, comprises a plurality of conveyor subsections 11-13, 21-23, 31-33. The number of conveyor subsections per conveyor section 10, 20, 30 is identical in the present exemplary embodiment, this not being imperative, however. The conveyor subsections 11-13, 21-23, 31-33 of a respective conveyor section 10, 20, 30 may be of identical length or may have different lengths.

Each of the conveyor subsections 11-13, 21-23, 31-33 has a respective associated drive 11A-13A, 21A-23A, 31A-33A. Appropriate actuation of the drives 11A-13A, 21A-23A, 31A-33A by means of a computing unit allows the conveyor subsections 11-13, 21-23, 31-33 to be individually accelerated or decelerated.

Arranged at the end of the conveyor sections 10, 20, 30, i.e. in the conveying direction FR, is a combining unit 40 to which the last conveyor subsections 13, 23, 33 in the conveying direction FR transfer the piece goods transported by them. A single output conveyor section 50 is arranged at an output 41 of the combining unit 40. Said output conveyor section may consist of one or more conveyor subsections 51. The conveyor subsection(s) 51 are in turn driven by a drive 51A under the control of the computing unit 60.

Accelerating and decelerating respective conveyor subsections by means of suitable control signals for the drives 11A-13A, 21A-23A, 31A-33A allows piece goods transported on the parallel conveyor sections 10, 20, 30 to be transported to the combining unit 40 at staggered times. The combining unit 40 is thereby rendered able to convey the piece goods onto the output conveyor section 50 in such a way that each pair of temporally successive piece goods is at a predetermined defined interval from one another.

In order to render the computing unit 60 able to deliver suitable actuation signals for accelerating and decelerating the drives 11A-13A, 21A-23A, 31A-33A, a respective conveyor subsection 11-13, 21-23, 31-33 is provided with a number of respective sensors 11S-13S, 21S-23S, 31S-33S. The sensors 11S-13S, 21S-23S, 31S-33S comprise in particular light barriers for ascertaining a respective speed of transport of a piece good, a length of the piece good, a position and/or a deviation from an expected position. The sensors optionally comprise e.g. rotation speed sensors for detecting the rotation speed of the drives 11A-13A, 21A-23A, 31A-33A, current sensors for detecting the motor currents of the drives 11A-13A, 21A-23A, 31A-33A, etc.

The piece goods are supplied to the conveyor sections 10, 20, 30 by way of respective transfer units 18, 28, 38, which are likewise in the form of conveyor subsections, for example. The transfer units 18, 28, 38 also have an applicable drive (which is not shown explicitly here, however) and a number of applicable sensors 18S, 28S, 38S. The transfer units may be segments that are independent of the actual conveyor sections 10, 20, 30. The transfer units 18, 28, 38 may also be a respective conveyor subsection of the associated conveyor section 10, 20, 30, however.

For the sake of simplicity, only the transfer units 18, 28, 38 are provided with applicable sensors 18S, 28S, 38S in FIG. 1. Applicable measurement signals are supplied to the computing unit 60 for further processing. A measurement signal is represented by a dotted line. For the sake of simplicity, not all measurement signals, or signal lines required for transmission, are shown.

The drives 11A-13A, 21A-23A, 31A-33A associated with the conveyor subsections 11-13, 21-23, 31-33 are controlled by applicable actuation signals by way of dashed lines. For the sake of simplicity, not all actuation signals, or actuation lines required for transmission, are shown.

The method for computer-implemented configuration of the controlled drive application of the logistics system 1 that is described below is carried out by the computing unit 60. The steps may also be carried out on a computing unit that is independent of the ultimate control of the logistics system 1, however. The procedure is shown schematically in FIG. 2.

In a first step S1, a system model of the logistics system 1 is determined on the basis of operating data BD of the logistics system. The operating data BD are available for a multiplicity of times in the operation of the logistics system 1 and comprise, for each time, measured values from the sensors 11S-13S, 21S-23S, 31S-33S, 18S-38S, such as e.g. light barrier signals, motor currents, positions of the piece goods on the respective conveyor subsections 11-13, 21-23, 31-33, 18-38, rotation speeds of the drives 11A-13A, 21A-23A, 31A-33A, and speeds of the conveyor subsections 11-13, 21-23, 31-33. In principle, it is possible to process not only operating data BD of the logistics system 1 currently under consideration, but also operating data BD from other logistics systems, which are then similar.

In addition, for each time, manipulated variable changes comprising e.g. speed changes, or rotation speed changes, of the drives 11A-13A, 21A-23A, 31A-33A, 18A-38A, are ascertained and processed in step S1.

The system model is determined using supervised learning methods, in particular by way of a neural network or a recurrent neural network. Since the procedure in this regard is known, a detailed description is dispensed with at this juncture.

In a second step S2, a control function of the logistics system 1 is determined. The control function REGF comprises at least configuration data KD for the drives 11A-13A, 21A-23A, 31A-33A, i.e. motor currents and/or rotation speeds and the like, with the result that the associated conveyor subsections 11-13, 21-23, 31-33 may be accelerated or decelerated in a suitable manner.

The control function REGF is determined on the basis of the system model determined in step S1 by specifying one or more performance features to be attained in order to perform at least one control operation in the system model. One or more of the following parameters may be processed as a performance feature, for example: a mean throughput of piece goods at the output 41 of the combining unit 40; an, in particular minimum, interval between two piece goods conveyed in direct succession, i.e. a gap interval; the detection of a collision in the combining unit 40, in particular at the output 41 thereof; an interval uniformity measure that characterizes a deviation of the intervals from an equidistance between each pair of piece goods conveyed in direct succession, i.e. a uniformity of the gap interval; and a running speed of the three conveyor sections of a respective conveyor section or of all of the conveyor sections, in order to achieve wear optimization, for example.

The control operation involves simulating the operating data BD for a multiplicity of time steps. A reward quantity is ascertained for each time step. Finally, the control function REGF used is the control operation, involving a predefined fitness function that aggregates the reward quantities for a multiplicity of time steps satisfying a predefined criterion. In particular, it is possible to work on maximizing the reward quantities.

The control function REGF is determined using methods that are suitable for creating a control operation that enhances the fitness function. The fitness function used may be for example the sum of the performance feature(s) over the time steps, e.g. the mean throughput. Such a procedure may be attained using reinforcement learning methods, the fitness function processed then being e.g. the discounted sum of the expected rewards. This may be e.g. the throughput or the proximity to a desired gap interval. Further aims may be a low width for the distribution of the package intervals (gap intervals) or a high running speed for the conveyor subsections while maintaining specific interval quantiles for the piece goods. Since some of the individual aims are inconsistent with one another, they need to be compensated for by way of the learnt actions of the control function REGF.

The second step S2 allows reinforcement learning to be used to learn an optimum control function REGF for the predefined fitness function on the basis of interactions with the system model. The control function REGF is therefore optimized by way of training against the system model of the logistics system 1. This may then be used to infer the interpretable control function REGF, which allows generation of the configuration data for the drives 11A-13A, 21A-23A, 31A-33A.

Model-based reinforcement learning approaches allow the control function REGF to be performed in the simulation of the system model, and a multiplicity of time steps may be simulated. By varying typical model input variables, such as e.g. sizes of the piece goods, the mass thereof, coefficients of friction and the like, it is possible to produce practically relevant distributions over operating data BD available hitherto. This allows a high level of robustness for the inferred control function REGF and configuration data KD.

Since the fitness function is also simulated for each time step, the trend in the reward quantities may be calculated approximately.

The use of an interpretable representation of the control operation permits interpretable control operations to be learnt. These allow empirical knowledge to be formalized and support in-situ adjustments when the logistics system 1 is started up.

When using the combination of a learnt system model with fast optimization methods, such as e.g. particle swarm optimization, control operations may be created for altered optimization aims in the short term. In the case of multistep optimization, similarly to known model predictive control, an adjustment to match altered optimization aims may be attained without delay.

Optimum configuration data KD may be determined using operating data from further logistics systems, in order to use Q-function-based reinforcement learning methods to learn a control function REGF. Alternatively, the system model may be trained with validity for all logistics systems, which then allows optimization for the logistics system currently under consideration.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented configuration of a controlled drive application of a logistics system, wherein the logistics system comprises a plurality of parallel- running conveyor sections for piece goods that each lead to a combining unit in the conveying direction, each of the conveyor sections including a plurality of conveyor subsections that are accelerated or decelerated by a respective associated drive under a control of a computing unit to render the combining unit able to combine the piece goods onto a single output conveyor section at defined intervals, the method comprising:

determining a system model of the logistics system on a basis of operating data of the logistics system, the operating data being available for a multiplicity of times in the operation of the logistics system and comprising, for each time, measured values from sensors of the logistics system and manipulated variable changes; and determining a control function of the logistics system, the control function comprising at least configuration data for the drives, on a basis of the system model by specifying one or more performance features to be attained to perform at least one control operation in the system model, involving simulating the operating data for a multiplicity of time steps, wherein a reward quantity is ascertained for each time step, and the control operation is used as the control function, involving a predefined fitness function that aggregates the reward quantities for a multiplicity of time steps satisfying a predetermined criterion.

2. The method as claimed in claim 1, wherein the system model is determined using supervised learning methods by way of a neural network or a recurrent neural network.

3. The method as claimed in claim 1, wherein the control function is determined by way of reinforcement learning.

4. The method as claimed in claim 1, wherein a sum of the performance feature(s) for the simulated time steps is processed as the fitness function.

5. The method as claimed in claim 1, wherein one or more of the following parameters are processed as a performance feature:

a mean throughput of piece goods at the output of the combining unit;

an interval between two piece goods conveyed in direct succession;

a detection of a collision in the combining unit at the output thereof;

an interval uniformity measure that characterizes a deviation of the intervals from an equidistance between each pair of piece goods conveyed in direct succession; and a running speed of the conveyor subsections of a respective conveyor section or of all of the conveyor sections.

6. The method as claimed in claim 1, wherein the control function is determined by varying one or more input variables of the system model.

7. The method as claimed in claim 6, wherein one or more of the following parameters are processed as input variables of the system model:

a respective speed of the conveyor subsections;

a position of a respective piece good;

a size of a respective piece good;

a throughput of piece goods at the output of the combining unit; and a collision in the combining unit at the output thereof.

8. The method as claimed in claim 7, wherein the input variables are operating parameters of the system model.

9. An apparatus for computer-implemented configuration of a controlled application of a logistics system, wherein the logistics system comprises a plurality of parallel-drive running conveyor sections for piece goods that each lead to a combining unit in the conveying direction, each of the conveyor sections including a plurality of conveyor subsections that are accelerated or decelerated by a respective associated drive under a control of a computing unit of the apparatus to render the combining unit able to combine the piece goods onto a single output conveyor section at defined intervals, the computing unit being designed to carry out the following steps:

determining a system model of the logistics system on a basis of operating data of the logistics system, the operating data being available for a multiplicity of times in the operation of the logistics system and comprising, for each time, measured values from sensors of the logistics system and manipulated variable changes; and determining a control function of the logistics system, the control function comprising at least configuration data for the drives, on a basis of the system model by specifying one or more performance features to be attained to perform at least one control operation in the system model, involving simulating the operating data for a multiplicity of time steps, wherein a reward quantity is ascertained for each time step, and the control operation is used as the control function, involving a predefined fitness function that aggregates the reward quantities for a multiplicity of time steps satisfying a predetermined criterion.

10. The apparatus as claimed in claim 9, the apparatus being designed to carry out a method for computer-implemented configuration of the controlled drive application of the logistics system.

11. A logistics system having one or more parallel-running conveyor sections for piece goods that each lead to a combining unit in the conveying direction, each of the conveyor sections including a plurality of conveyor subsections that are accelerated or decelerated by a respective associated drive under a control of a computing unit to render the combining unit able to combine the piece goods onto a single output conveyor section at defined intervals, wherein the logistics system comprises the apparatus as claimed in claim 9.

12. A computer program product, comprising a computer readable hardware storage device having computer readable program code stored therein, said program code executable by a processor of a computer system to implement a method as claimed in claim 1 when the program code is executed on a computer.

* * * * *